United States Patent
Takayasu et al.

(10) Patent No.: US 9,836,954 B2
(45) Date of Patent: Dec. 5, 2017

(54) RADIO CONTROL TRANSMITTER

(71) Applicant: Futaba Corporation, Mobara-shi, Chiba (JP)

(72) Inventors: Michihiro Takayasu, Mobara (JP); Hideo Kitazawa, Mobara (JP)

(73) Assignee: FUTABA CORPORATION, Chiba (JP)

( * ) Notice: Subject to any disclaimer, the term of this patent is extended or adjusted under 35 U.S.C. 154(b) by 23 days.

(21) Appl. No.: 14/490,928

(22) Filed: Sep. 19, 2014

(65) Prior Publication Data

US 2015/0091697 A1    Apr. 2, 2015

(30) Foreign Application Priority Data

Sep. 30, 2013  (JP) .................................. 2013-203366
May 12, 2014   (JP) .................................. 2014-098786

(51) Int. Cl.
*G05B 19/00*    (2006.01)
*G08C 17/02*    (2006.01)
*H04B 1/04*     (2006.01)

(52) U.S. Cl.
CPC ............... *G08C 17/02* (2013.01); *H04B 1/04* (2013.01)

(58) Field of Classification Search
CPC ................................. G08C 17/02; H04B 1/04
USPC ................................................ 340/564, 5.64
See application file for complete search history.

(56) References Cited

U.S. PATENT DOCUMENTS

| | | | | |
|---|---|---|---|---|
| 4,063,056 A * | 12/1977 | Baker | ................... | H01H 13/186 200/332 |
| 5,989,123 A * | 11/1999 | Tosaki | ................... | A63F 13/06 463/37 |
| 5,995,104 A * | 11/1999 | Kataoka | ................. | G05G 9/047 715/848 |
| 6,564,788 B1 * | 5/2003 | Hu | .......................... | F41B 7/003 124/31 |
| 6,821,184 B1 * | 11/2004 | Yeung | ................... | A63H 17/395 446/456 |
| 7,029,363 B2 * | 4/2006 | Ogihara | ................. | A63H 17/36 341/176 |
| 7,220,160 B2 * | 5/2007 | Kiuchi | ................... | A63H 30/04 341/176 |
| 2003/0214428 A1 * | 11/2003 | Tokita | ................... | A63H 30/04 341/176 |
| 2003/0221943 A1 * | 12/2003 | Masuda | ................. | H01H 13/48 200/406 |
| 2004/0018800 A1 * | 1/2004 | Caiozza | ................. | A63H 30/04 446/454 |
| 2005/0274563 A1 * | 12/2005 | Ahnafield | ............. | B60W 30/18 180/336 |
| 2006/0238505 A1 * | 10/2006 | Ahlgren | ................ | G06F 3/0338 345/161 |

(Continued)

FOREIGN PATENT DOCUMENTS

JP          H09140947 A     3/1997

*Primary Examiner* — Zhen Y Wu
(74) *Attorney, Agent, or Firm* — Quarles & Brady LLP (57) ABSTRACT

A trigger includes a segment for exercising throttle control and a segment for exercising brake control. A switch is provided in a radio control transmitter. The switch can be depressed by pulling the trigger in a direction of an arrow A. Setting of full throttle can be assigned to the switch. Full throttle can be turned on only when the switch is depressed by the trigger. It is possible to control on/off of the full throttle easily.

2 Claims, 9 Drawing Sheets

(56) References Cited

U.S. PATENT DOCUMENTS

| | | | | |
|---|---|---|---|---|
| 2006/0247578 A1* | 11/2006 | Arguedas | ............... | A61D 1/025 604/181 |
| 2010/0206703 A1* | 8/2010 | Puzio | ........................ | B25F 5/02 200/61.85 |
| 2011/0003526 A1* | 1/2011 | Mathieu | ............... | A63H 27/008 446/34 |
| 2011/0074678 A1* | 3/2011 | Reinecke | .............. | G06F 3/0338 345/161 |
| 2011/0234369 A1* | 9/2011 | Cai | ........................ | G06F 3/0346 340/4.31 |
| 2015/0279580 A1* | 10/2015 | Okazaki | ............... | G06F 3/0338 200/4 |

\* cited by examiner

RADIO CONTROL TRANSMITTER

CROSS-REFERENCE TO RELATED APPLICATIONS

This application claims the priority benefit of Japanese Patent Application 2013-203366 filed Sep. 30, 2013 and Japanese Patent Application 2014-098786 filed May 12, 2014. The contents of both of these applications are hereby incorporated by reference as if set forth in their entirety herein.

BACKGROUND

Technical Field

The present invention relates to a radio control transmitter, and relates to a radio control transmitter having a switch capable of implementing multiple functions with ease.

Related Art

In radio control transmitters which conducts remote control on a model which is a target object such as a model car or a model plane by using radio communication, there are various shapes according to the model to be controlled.

As main shapes, there are a stick type radio control transmitter in which two sticks are arranged on the left and right sides and used to control a model plane, a model helicopter, a model car, a model ship, or the like, and a trigger type radio control transmitter which has a trigger to control a throttle of an engine or a motor and a wheel to control steering of the model and which is mainly used to control a model automobile.

In the trigger type radio control transmitter, operation members are provided to manipulate the model besides the trigger and the wheel.

Among these operation members, there is a switch or the like provided on a grip used by an operator to hold the radio control transmitter as described in JP 09-140947. The switch is made operable while operating the wheel or the trigger.

SUMMARY

The switch provided on the grip can be operated while conducting other operations. However, it is difficult to operate the switch during a race competition in which model cars are actually caused to travel and compete in time and fine operations are demanded.

For example, there is no relevancy between an operation amount in the trigger or wheel and on/off control of the switch. Therefore, the operation amount in the trigger at the time when the switch is operated is not always constant. As a result, an operation registered for the switch cannot be always implemented under the same condition, and an effect expected by the operator cannot be exhibited sometimes. In addition, it is also considered that the operator is aware of the operation of the switch and consequently attention to the operation or the wheel is lost.

In view of such problems, an object of the present invention is to provide a switch that can be operated to be interlocked with an operation of an operation unit provided to control the speed of the model.

A radio control transmitter according to a first aspect of the present invention includes an operation member configured to control a travel speed of a target to be controlled, and is configured to transmit a control signal to the target to be controlled, the radio control transmitter including a switch configured to be capable of being depressed by the operation member.

A radio control transmitter according to a second aspect of the present invention is the radio control transmitter according to the first aspect of the present invention wherein the operation member can be operated in two directions around a neutral position, and the switch is disposed in a position where the operation member can depress the switch when the operation member is operated in one of the two directions.

A radio control transmitter according to a third aspect of the present invention is the radio control transmitter according to the first or second aspect of the Present invention, wherein a signal is transmitted to execute a special operation of the target to be controlled preset in the radio control transmitter, when the switch is depressed.

A radio control transmitter according to a fourth aspect of the present invention includes an operation member configured to control a travel speed of a target to be controlled, and is configured to transmit a control signal to the target to be controlled, the operation member being capable of being operated in two directions around a neutral position, and the radio control transmitter including a first switch configured to be capable of being depressed by the operation member when the operation member is operated in one of the two directions, and a second switch configured to be capable of being depressed by the operation member when the operation member is operated in the other of the two directions.

A radio control transmitter according to a fifth aspect of the present invention is the radio control transmitter according to the fourth aspect of the present invention, wherein a signal is transmitted to execute a special operation of the target to be controlled preset in the radio control transmitter, when each of the first switch and the second switch is depressed.

A radio control transmitter according to a sixth aspect of the present invention is the radio control transmitter according to any of the first to fifth aspects of the present invention, wherein a shaft of the operation member is supported by the radio control transmitter, the operation member is rotated around the shaft, and a part of the operation member comes in contact with a part of the radio control transmitter when the rotation becomes at least a predetermined amount.

A radio control transmitter according to a seventh aspect of the present invention is the radio control transmitter according to any of the first to sixth aspects of the present invention, wherein the operation member is a trigger taking a shape of a trigger for a gun.

A radio control transmitter according to an eighth aspect of the present invention is the radio control transmitter according to the any of the first to seventh aspect of the present invention, wherein the switch is a pseudo switch having no internal contact and a pressure unit has elasticity.

A radio control transmitter according to a ninth aspect of the present invention is the radio control transmitter according to the first to eighth aspect of the present invention, wherein a projection is provided on a face of the operation member which comes in contact with the pressure unit.

A radio control transmitter according to a tenth aspect of the present invention is the radio control transmitter according to the eighth or ninth aspect of the present invention, wherein the pressure unit is provided to be attachable to and detachable from casing.

The switch can be operated to be interlocked with the operation unit. Therefore, even in a scene such as in a competition in which fine operations are demanded, the function assigned to the switch can be implemented easily.

DETAILED DESCRIPTION

EXAMPLE 1

Hereafter, Example 1 of the invention will be described with reference to FIGS. 1 to 4.

Figure 1:
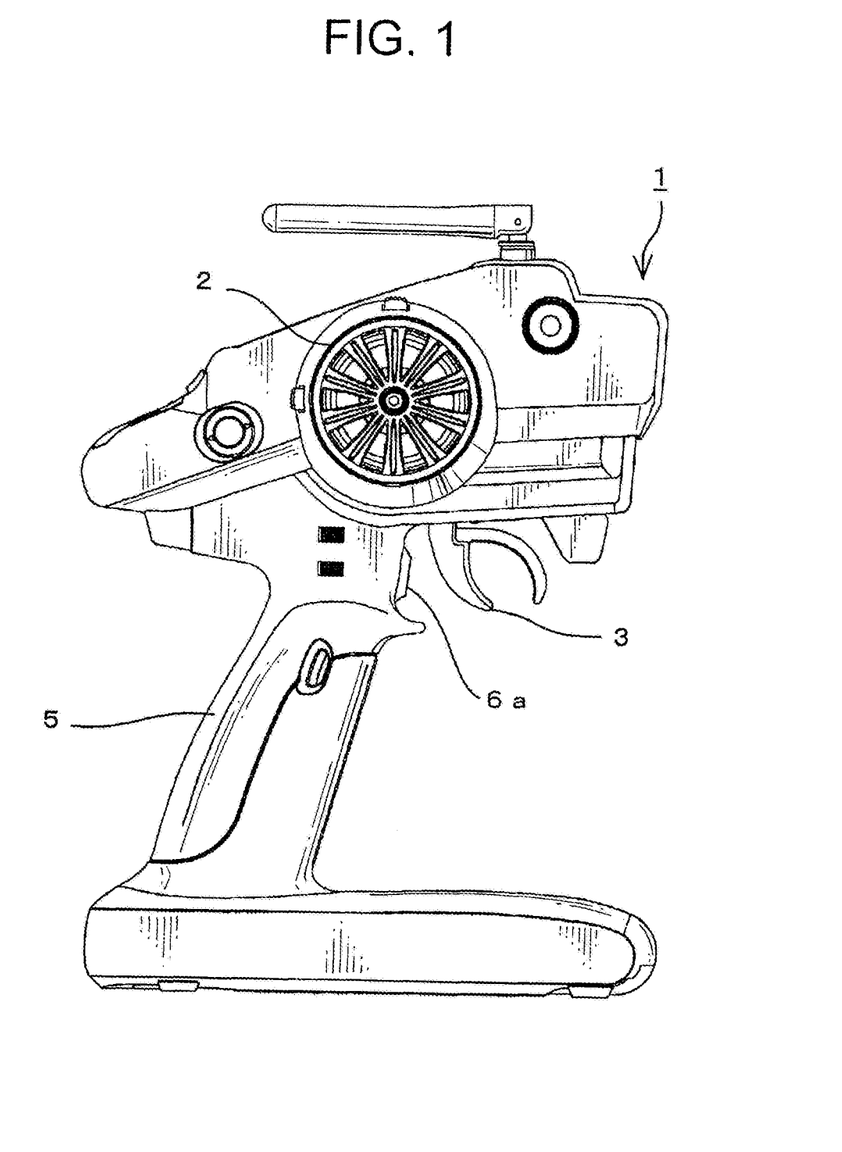
FIG. 1 is a front view of a radio control transmitter according to Example 1 of the present invention.
Figure 2:
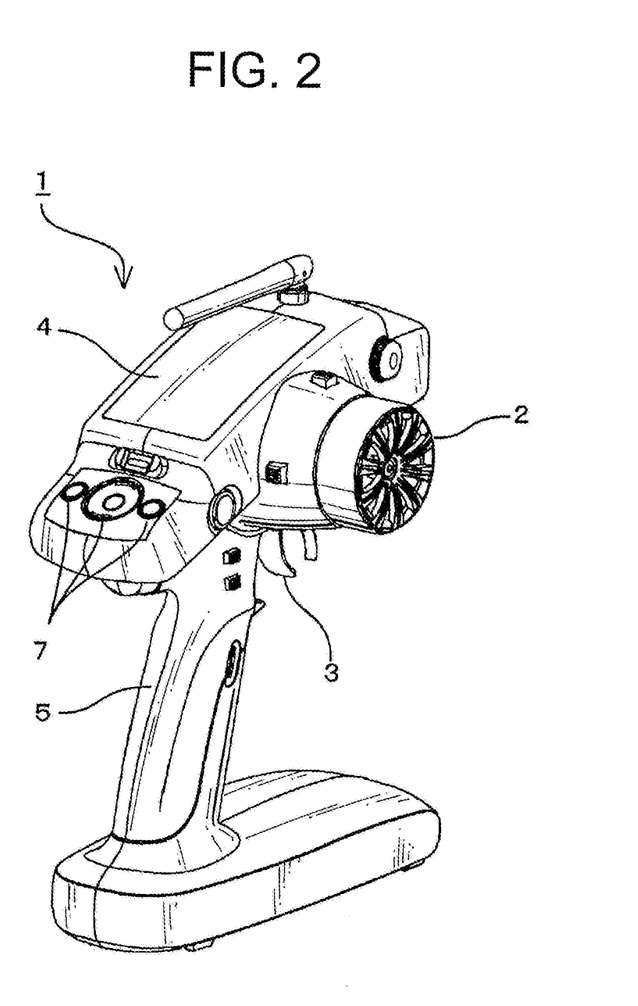
FIG. 2 is a perspective view of the radio control transmitter according to Example 1 of the present invention.

FIGS. 1 and 2 are diagrams showing exterior views of a radio control transmitter. A radio control transmitter 1 includes a wheel 2, a trigger 3, and a display 4.

Figure 3:
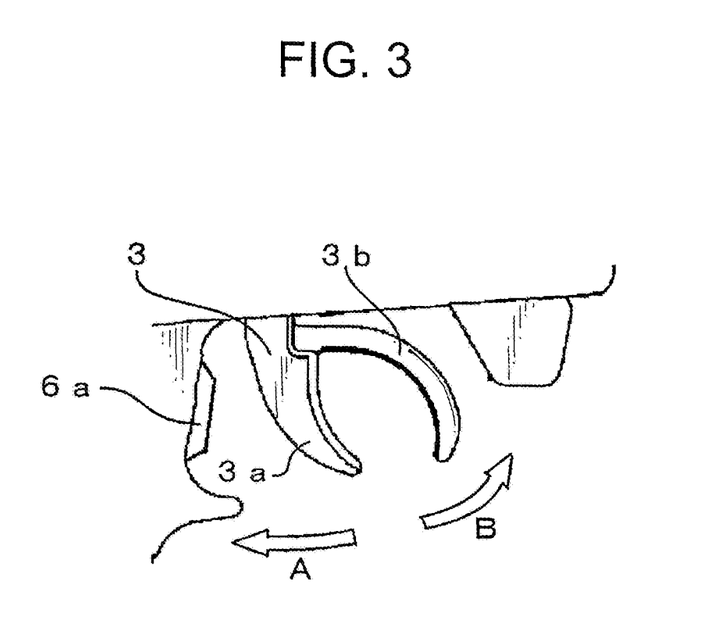
FIG. 3 is an expanded view of a peripheral portion of a trigger in the radio control transmitter according to Example 1 of the present invention.

FIG. 3 is an expanded view of periphery of the trigger 3 in the radio control transmitter 1.

Figure 4:
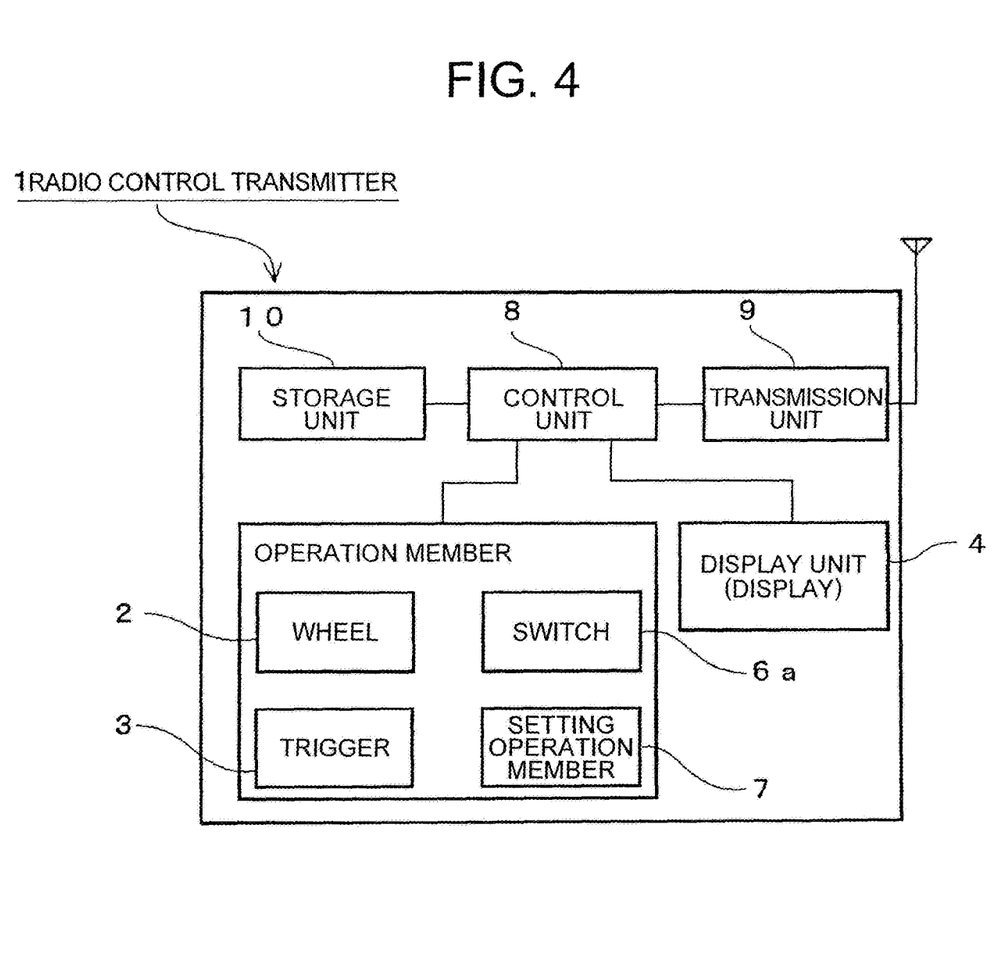
FIG. 4 is a block diagram schematically showing a configuration of the radio control transmitter according to Example 1 of the present invention.

Although not illustrated, an electronic circuit is provided within the radio control transmitter 1 to generate a control signal for remote control of a model and transmit the control signal to the model. FIG. 4 is a block diagram of the radio control transmitter 1 inclusive of these functions.

As for kinds of the model to be remotely controlled by the trigger type radio control transmitter shown in FIG. 1, there are a model car, a model ship and the like. However, the present example will be described supposing model car.

Furthermore, the present example will be described supposing that an engine is used as a power source of the model. However, a motor may be used as the power source.

In general, an operator grasps a grip 5 of the radio control transmitter 1 with one hand, sets a forefinger of the hand grasping the grip 5 on the trigger 3, and operates the trigger 3. Furthermore, the operator grasps the wheel 2 with the other hand and conducts operation.

The wheel 2 is an operation member functioning as a steering to control the progress direction of the model. The wheel 2 is supported by a rotation shaft which extends in a main body direction of the radio control transmitter 1 perpendicularly to a face of the wheel 2 which nearly takes a disk shape with a center of the face being caused to coincide with a center of the shaft. The wheel 2 rotates counterclockwise and clockwise from a predetermined reference position.

The trigger 3 is an operation member for controlling the power source of the model and controlling the travel speed of the model. A shaft of the trigger 3 is supported by the main body of the radio control transmitter 1, and attached to be able to rotate in a direction of an arrow A and a direction of an arrow B in FIG. 3 from an initial position.

In general, the trigger 3 is operated by setting a forefinger of a hand grasping the grip 5 on a segment 3a and pulling the segment. 3a in the direction of the arrow A. And the trigger 3 is operated in the direction of the arrow B by pushing a segment 3b with a back of the finger set on the segment 3a. If the trigger 3 is operated continuously, the trigger 3 comes in contact with the radio control transmitter 1.

If the finger set on the segment 3a is released, the trigger 3 automatically returns to a previously set initial position. The initial position is referred to as neutral position. In the neutral position, the engine of the model rotates, but a clutch is disconnected and the model is in a state in which the model does not travel.

In a case where the power source is a motor, the motor does not rotate in the neutral position.

Throttle control in the engine of the model is exercised and the travel speed of the model is controlled by pulling the trigger 3 in the direction of the arrow A in FIG. 3. As the trigger 3 is operated in the direction of the arrow A, the model is accelerated.

Furthermore, brake control can be exercised by operating the trigger 3 in the direction of the arrow B. As the trigger 3 is operated in the direction of the arrow B, intense braking is obtained. According to setting in the radio control transmitter 1, some model progresses backward if the trigger 3 is operated in the direction of the arrow B.

In the case where a motor is used as the power source of the model as well, the model can be accelerated by operating the trigger 3 in the direction of the arrow A.

Besides the wheel 2 and the trigger 3, a large number of operation members such as buttons are provided in the radio control transmitter 1. Special operations concerning operation of the model can be assigned to these operation members.

A switch 6a is a push switch in which an internal contact turns on when a load acts on a pressure unit to be subject to load and a predetermined displacement is caused in the pressure unit. The switch 6a is provided to be capable of being depressed by the segment 3a of the trigger 3 when the trigger 3 is pulled in the direction of the arrow A. In other words, the switch 6a is provided in a position where the segment 3a of the trigger 3 and the radio control transmitter 1 come in contact with each other when the trigger 3 is progressively operated.

If the operator operates the trigger 3 in the direction of the arrow A, the segment 3a comes in contact with the switch 6a. The internal contact of the switch 6a does not turn on with a load to an extent that the segment 3a comes in contact with the switch 6a. When a further load is applied and a predetermined displacement is caused in the pressure unit, the internal contact turns on.

The pressure unit in the switch 6a to which the load is applied may include a hard member or a member having elasticity to an extent that the operator can recognize that the segment 3a has come in contact.

Furthermore, when released from the depression caused by the trigger 3, the switch 6a returns to an initial position thereof.

Special setting concerning an operation of the model can be assigned to the switch 6a and used. The function assigned to the switch 6a will be described later.

The display 4 is a display device for displaying setting in the radio control transmitter 1. It is possible to switch contents of display and change setting in the radio control transmitter 1 by operating a setting operation member 7 provided on the periphery of the display 4.

The radio control transmitter 1 includes a control unit 8 to generate a control signal depending upon operation or setting of the wheel 2 or the trigger 3, a transmission unit 9 to transmit a control signal, and a storage unit 10 to store the setting and the like, as internal electronic circuits.

In the present example, the operator previously conducts setting on the storage unit 10 via the control unit 8 to make the throttle full open when the switch 6a is on, while confirming the display on the display 4 by using the setting operation member 7.

By doing so, full throttle in which the throttle is full open can be implemented when the switch 6a is pressed by the trigger 3.

In a race competition using a model car which is one kind of the models, the model car must travel over a determined time with limited fuel or battery. Travel of the model with full throttle can be changed easily by turning on/off the switch 6a. Therefore, it is possible to prevent unnecessary travel with full throttle and extraneous use of the fuel or battery by preventing the switch 6a from being depressed even if the trigger 3 is pulled to maximum in the direction of the arrow A.

EXAMPLE 2

A configuration of a radio control transmitter according to Example 2 is similar to that according to Example 1. Therefore, the same components are denoted by same reference characters, and description thereof will be omitted.

In Example 2, the operator previously conducts setting on the storage unit 10 via the control unit 8 to conduct partial throttle when the switch 6a is on, while confirming the display on the display 4 by using the setting operation member 7.

The partial throttle is one kind of throttle control in which the travel speed of the model is made constant. By setting the switch 6a as in the present example, the switch 6a is pushed to be interlocked with operation of the trigger 3 and consequently the travel speed of the model can be kept constant.

It becomes easily possible to make the model travel with partial throttle according to the operation of the trigger 3 by providing the switch 6a. As a result, it becomes possible to suppress consumption of the battery or fuel in the model.

EXAMPLE 3

A configuration of a radio control transmitter according to Example 3 is similar to that according to Example 1. Therefore, the same components are denoted by same reference characters, and description thereof will be omitted.

The operator previously conducts setting on the storage unit 10 via the control unit 8 to turn on a turbo function when the switch 6a is on, while confirming the display on the display 4 by using the setting operation member 7. In a case where the present example is used, a DC motor is used as the power source for the model.

The turbo function is a function of changing motor timing. It is possible to let a current flow through a commutator in the motor at optimum timing and increase the number of rotations of the motor by adjusting the motor timing. The ordinary turbo function adjusts the motor timing according to contents previously set and accelerate the model when the full throttle in which the operation amount of the trigger 3 is maximum is attained.

By previously setting the turbo function in the switch 6a according to the present invention, it becomes possible to arbitrarily control on/off of the turbo function, which in ordinary circumstances automatically turns on in the full throttle state, depending upon depression of the switch 6a.

EXAMPLE 4

Figure 5:
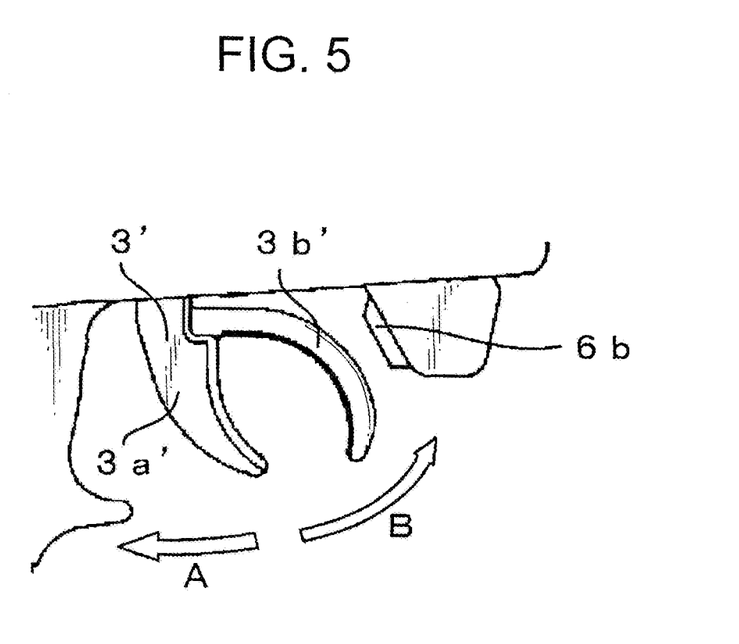
FIG. 5 is an expanded view of a peripheral portion of a trigger in a radio control transmitter according to Example 4 of the present invention.

FIG. 5 is an expanded view of a peripheral portion of a trigger in a radio control transmitter according to Example 4 of the present invention.

Since portions other than the peripheral portion of a trigger 3' are similar to those in Example 1, description thereof will be omitted.

The trigger 3' includes a segment 3a' used to pull the trigger 3' in a direction of an arrow A and a segment 3b' used to operate the trigger 3' in a direction of an arrow B.

A switch 6b is a push switch in which an internal contact turns on when a load acts on a pressure unit to be subject to load and a predetermined displacement is caused in the pressure unit. The switch 6b is provided to be capable of being depressed by the segment 3b' of the trigger 3' when the trigger 3' is operated in the direction of the arrow B.

If the operator operates the trigger 3' in the direction of the arrow B, the segment 3b' comes in contact with the switch 6b. The internal contact of the switch 6b does not turn on with a load to an extent that the segment 3b' comes in contact with the switch 6b. When a further load is applied and a predetermined displacement is caused in the pressure unit, the internal contact turns on.

The pressure unit in the switch 6b to which the load is applied may include a hard member. Or the pressure unit may include a member having elasticity to an extent that the operator can recognize that the segment 3b' has come in contact.

Furthermore, when released from the depression caused by the trigger 3', the switch 6b returns to an initial position thereof.

Special setting concerning an operation of the model can be assigned to the switch 6b and used.

In Example 4, the operator previously sets an intense brake function for the switch 6b on the storage unit 10 via the control unit 8, while confirming the display on the display 4, which is a display device, by using the setting operation member 7.

Here, the intense brake function means a brake that locks rotation of tires of the model.

If setting of a brake including an intense brake is conducted by using only the trigger 3', the tires might be locked although it is not desired to lock the tires depending upon some setting when the trigger 3' is operated in the direction of the arrow B. In the present example, it is possible to apply an intense brake only when the switch 6b is being depressed.

Especially in a case where it is intended to conduct drift travel in the model, an intense brake is intentionally applied to lock the tires sometimes. It is possible to easily change how to apply a brake to the model and facilitate drift travel by using the switch 6b.

EXAMPLE 5

A configuration of a radio control transmitter according to Example 5 is similar to that according to Example 4. Therefore, the same components are denoted by same reference characters, and description thereof will be omitted.

In Example 5, the operator previously sets a function of ABS for the switch 6b on the storage unit 10 via the control unit 8, while confirming the display on the display 4, which is a display device, by using the setting operation member 7.

The ABS means an antilock brake system. The ABS is a function of preventing tires from being locked when a sudden brake is applied.

It is possible to conduct an ordinary brake operation in the usual operation of the trigger 3' in the direction of the arrow B and activate the ABS function only when the switch 6b is depressed, by previously setting the ABS function on the switch 6b.

EXAMPLE 6

Figure 6:
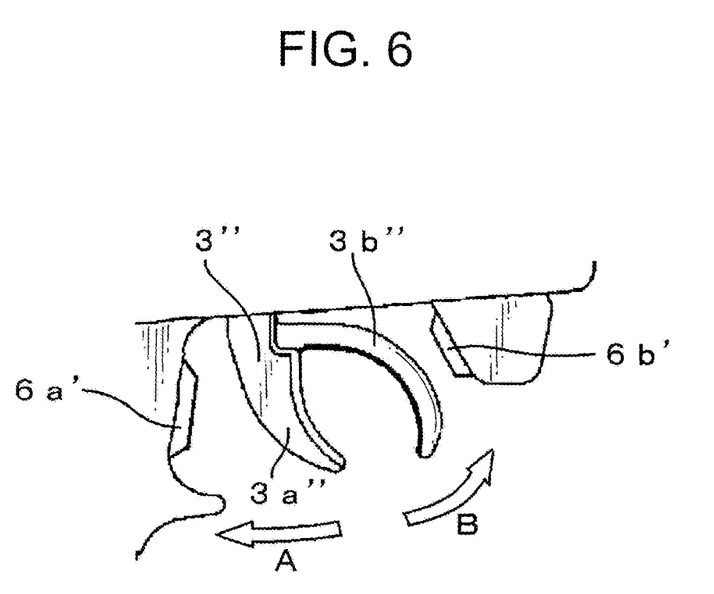
FIG. 6 is an expanded view of a peripheral portion of a trigger in a radio control transmitter according to Example 6 of the present invention.

FIG. 6 is an expanded view of a peripheral portion of a trigger in a radio control transmitter according to Example 6 of the present invention.

Since portions other than the peripheral portion of a trigger 3" are similar to those in Example 1, description thereof will be omitted.

The trigger 3" includes a segment 3a" used to pull the trigger 3" in a direction of an arrow A and a segment 3b" used to operate the trigger 3" in a direction of an arrow B.

A first switch 6a' is provided to be capable of being depressed when the trigger 3" is pulled in the direction of the arrow A. A second switch 6b' is provided to be capable of being depressed when the trigger 3" is operated in the direction of the arrow B.

In particular, it is desirable that the first switch 6a' can be depressed when the operation amount of the trigger 3" in the direction of the arrow A is maximized and the second switch 6b' can be depressed when the operation amount of the trigger 3" in the direction of the arrow B is maximized.

When released from the depression caused by the trigger 3", each of the first switch 6a' and the second switch 6b' returns to an initial position thereof.

Furthermore, special setting concerning an operation of the model can be assigned to the first switch 6a' and the second switch 6b' and used.

In Example 6, the operator can previously select setting of conducting full throttle, setting of conducting partial throttle, or setting the turbo function for the first switch 6a' and conduct the setting on the storage unit 10 via the control unit 8, while confirming the display on the display 4, which is a display device, by using the setting operation member 7.

Furthermore, it is possible to set an intense brake or the ABS for the second switch 6b".

As an example other than Examples 1 to 6 described heretofore, the trigger may have another shape. For example, a ring shape obtained by coupling tips of the segment 3a and the segment 3b of the trigger 3 shown in FIG. 3 may be made operable in the directions of the arrow A and the arrow B.

Furthermore, the trigger 3 in Examples 1 to 3 shown in FIG. 3 may take a shape having no segment 3b used to operate the trigger 3 in the direction of the arrow B, as a radio control transmitter that does not exercise brake control.

EXAMPLE 7

Figure 7:
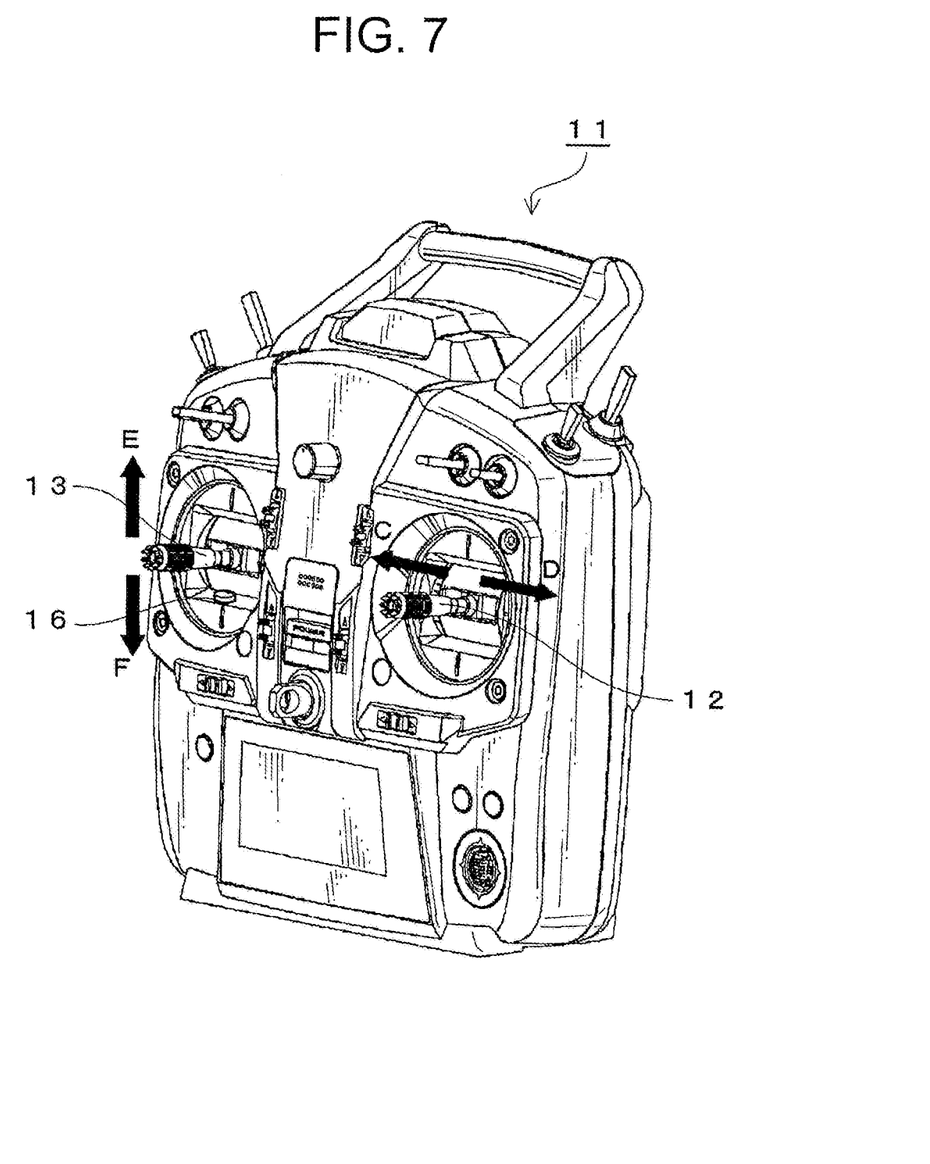
FIG. 7 is a perspective view of a radio control transmitter according to Example 7 of the present invention.

FIG. 7 is a perspective view of a radio control transmitter according to Example 7 of the present invention. A radio control transmitter 11 includes a stick 12 and a stick 13.

The radio control transmitter 11 includes the stick 12 and the stick 13 instead of the wheel 2 and the trigger 3 in the radio control transmitter 1 according to Example 1. Except them, the radio control transmitter 11 has a configuration similar to that of the radio control transmitter 1 according to Example 1.

The stick 12 is an operation member functioning as a steering to control the progress direction of the model. The stick 12 can be operated in the directions of the arrow C and the arrow D.

The stick 13 is an operation member used to control the travel speed of the model. A shaft of the stick 13 is supported by the radio control transmitter 11. The stick is attached to be rotatable in the directions of an arrow E and an arrow F.

The engine throttle of the model is controlled to control the travel speed of the model by operating the stick 13 in the direction of the arrow E. As the stick 13 is operated in the direction of the arrow E, the model is accelerated.

Furthermore, it is possible to set to exercise brake control by operating the stick 13 in the direction of the arrow F. And the brake becomes intense as the stick 13 is operated in the direction of the arrow F.

If the stick 13 is operated, the stick 13 ultimately comes in contact with the radio control transmitter 11. Furthermore, if an operating finger is detached from the stick 13, the stick 13 automatically returns to a neutral Position.

A switch 16 is a push switch in which an internal contact turns on when a load acts on a pressure unit to be subject to load and a predetermined displacement is caused in the pressure unit. The switch 16 is provided to be capable of being depressed by the shaft portion of the stick 13 when the stick 13 is operated in the direction of the arrow F. In other words, the switch 16 is provided in a position where a portion of the stick 13 and the radio control transmitter 11 come in contact with each other when the stick 13 is progressively operated.

If the operator operates the stick 13 in the direction of the arrow F, the shaft portion of the stick 13 comes in contact with the switch 16. The internal contact of the switch 16 does not turn on with a load to an extent that the shaft portion of the stick 13 comes in contact with the switch 16. When a further load is applied and a predetermined displacement is caused in the pressure unit, the internal contact turns on.

The pressure unit in the switch 16 to which the load is applied may include a hard member. Or the pressure unit may include a member having elasticity to an extent that the operator can recognize that the shaft portion of the stick 13 has come in contact.

In Example 7, the operator previously sets an intense brake function for the switch 16 on the storage unit 10 via the control unit 8, while confirming the display on the display 4, which is a display device, by using the setting operation member 7. In the present example, an intense brake can be applied only when the switch 16 is depressed, and effects similar to those in Example 4 can be obtained.

In Example 7, the switch 16 is provided to be capable of being depressed by the stick 13 when the stick 13 is operated in the direction of the arrow F. However, the switch may be provided in a position where the switch can be depressed when the stick 13 is operated in the direction of the arrow E. Furthermore, a switch may be provided in each of positions where the stick can be depressed when the stick is operated in either of directions of the arrow E and the arrow F.

Furthermore, as for the stick 12 and the stick 13, an object to be controlled may be made switchable. In addition, the model may be set to be accelerated when the stick 13 is operated in the direction of the arrow F.

Heretofore, Examples 1 to 7 have been described as examples of the invention. However, examples of the invention are not restricted thereto.

Setting other than setting described heretofore in Examples may be conducted for the switch 6a, the switch 6b, the first switch 6a', the second switch 6b', or the switch 16 described in Examples 1 to 7. Furthermore, contents of setting may be made changeable arbitrarily.

It is desirable that contents set for each of the switches can exhibit a higher effect by arbitrarily depressing the switch depending upon the operation amount of the trigger or stick which is an operation member.

Furthermore, as other examples, a configuration having a detection element provided within the pressure unit of the switch to detect a load in the radio control transmitters according to Examples 1 to 7 may be used. The control unit may have a configuration that receives an output of the detection element and turns on the contents set for the switch when it is determined that the trigger or the stick, which is an operation member for controlling the travel speed of the model, has acted on the pressure unit in the switch with at least a predetermined load.

At this time, the internal contact of the switch becomes unnecessary. Furthermore, it is desirable that the pressure unit has elasticity to an extent that the operator can recognize whether the trigger or the stick comes in contact.

Furthermore, as other examples, it is possible to use, in the radio control transmitters according to Examples 1 to 7, a configuration in which the control unit detects the operation amount of the trigger or the stick, which is the operation member used to control the travel speed of the model, and turns on contents set for the switch when the trigger or the stick has reached at least an operation amount enough for the trigger or the switch to come in contact with the switch, and the switch is provided as a pseudo switch having no internal contact.

At this time, it is desirable that the pressure unit has elasticity to an extent that the operator can recognize whether the trigger or the stick comes in contact.

Example 8 and Example 9 of a radio control transmitter in which the above-described pseudo switch having no internal contact is provided will now be described with reference to FIGS. 8 and 9.

EXAMPLE 8

Figure 8:
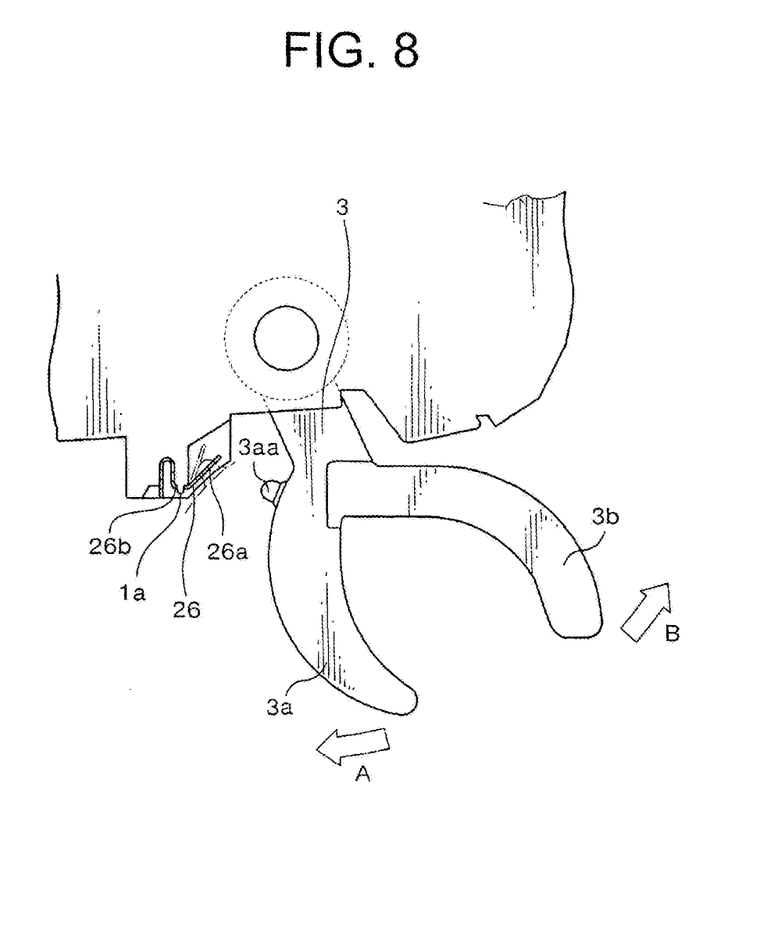
FIG. 8 is an expanded view of a peripheral portion of a trigger in a radio control transmitter according to Example 8 of the present invention.

FIG. 8 is an expanded view of a peripheral portion of a trigger in a radio control transmitter according to Example 8 of the present invention. The radio control transmitter according to Example 8 is equivalent to that according to Example 1 except a configuration concerning a pseudo switch. Therefore, the same components are denoted by same reference characters, and description thereof will be omitted.

The trigger 3 includes a segment 3a used to pull the trigger 3 in a direction of an arrow A, and a segment 3b used to operate the trigger 3 in a direction of an arrow B. Furthermore, a projection 3aa is provided on the segment 3a to press a pseudo switch 26.

The pseudo switch 26 is provided on a casing side of the radio control transmitter 1 to be capable of being pressed by the projection 3aa on the segment 3a of the trigger 3 when the trigger 3 is pulled in the direction of the arrow A. In other words, the pseudo switch 26 is provided in a position where the projection 3aa on the segment 3a of the trigger 3 comes in contact with the casing of the radio control transmitter 1 and presses the casing when the trigger 3 is progressively operated. Further, the pseudo switch 26 includes a leaf spring that has elasticity and that is displaced by pressure of the projection 3aa on the segment 3a of the trigger 3. The leaf spring functioning as the pseudo switch 26 includes a pressure unit (pressure face) 26a displaced by pressure of the projection 3aa when the segment 3a of the trigger 3 is rotated in the direction of the arrow A, and a fitting hole 26b into which a fitting projection is of the casing fits. The leaf spring is attached to the casing to be attachable to and detachable from the casing by fitting the fitting projection 1a into the fitting hole 26b.

In Example 8, the operator previously executes setting of conducting full throttle, setting of conducting partial throttle, or setting of turning on the turbo function when the pseudo switch 26 is on, i.e., when the pressure unit 26a in the pseudo switch 26 comes in contact with the projection 3aa on the segment 3a of the trigger 3 and is pressed, on the storage unit 10 via the control unit 8, while confirming the display on the display 4, which is a display device, by using the setting operation member 7.

If the setting of conducting full throttle when the pseudo switch 26 is on is executed, full throttle in which the throttle is fully open can be attained in the same way as Example 1 when the pressure unit 26a in the pseudo switch 26 is pressed by the projection 3aa on the segment 3a of the trigger 3. If the setting of conducting the partial throttle when the pseudo switch 26 is on is executed, it becomes easily possible to make the model travel with partial throttle according to the operation of the trigger 3 and it becomes possible to suppress consumption of the battery or fuel in the model in the same way as Example 2 when the pressure unit 26a in the pseudo switch 26 is pressed by the projection 3aa on the segment 3a of the trigger 3. In addition, if the setting of turning on the turbo function when the pseudo switch 26 is on is executed, it becomes possible to arbitrarily control on/off of the turbo function which is automatically turned on in the state of full throttle in ordinary circumstances in the same way as Example 3 by depression of the pseudo switch 26 when the pressure unit 26a in the pseudo switch 26 is pressed by the projection 3aa on the segment 3a of the trigger 3.

EXAMPLE 9

Figure 9:
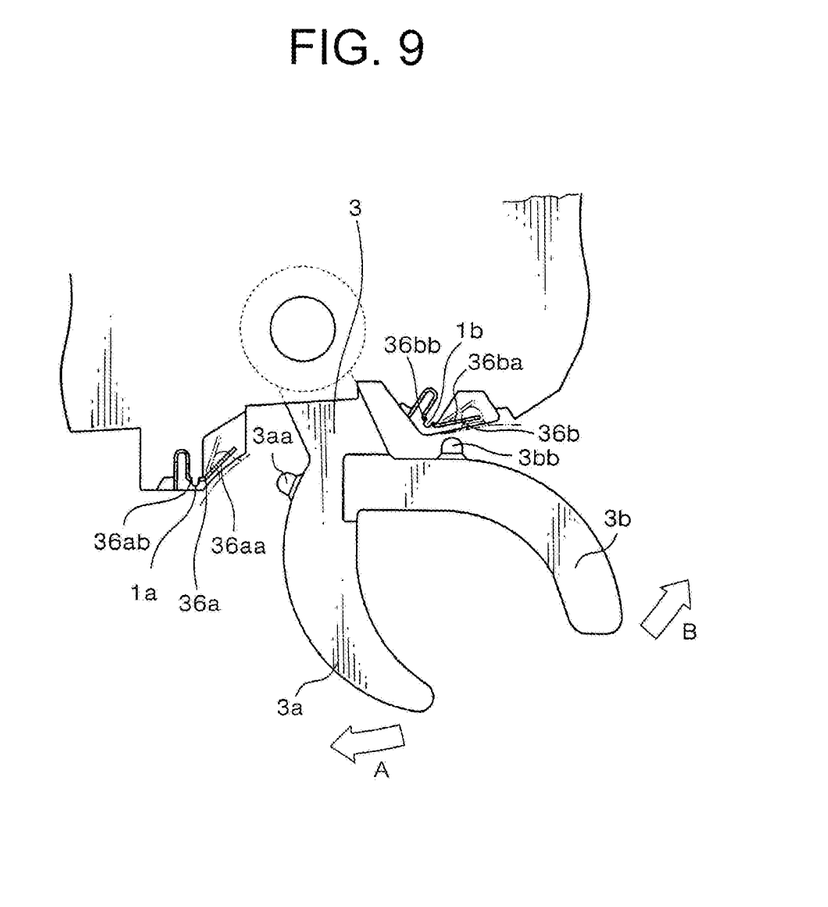
FIG. 9 is an expanded view of a peripheral portion of a trigger in a radio control transmitter according to Example 9 of the present invention.

FIG. 9 is an expanded view of a peripheral portion of a trigger in a radio control transmitter according to Example 9 of the present invention. The radio control transmitter according to Example 9 is similar to that according to Example 8 except the peripheral portion of the trigger. Therefore, the same components are denoted by same reference characters, and description thereof will be omitted.

The trigger 3 includes a segment 3a used to pull the trigger 3 in a direction of an arrow A, and a segment 3b used to operate the trigger 3 in a direction of an arrow B. Furthermore, a projection 3aa is provided on the segment 3a to press a first pseudo switch 36a. In addition, a projection 3bb is provided on the segment 3b to press a second pseudo switch 36b.

The first pseudo switch 36a is provided on a casing of the radio control transmitter 1 to be capable of pressing a pressure unit 36aa by the projection 3aa on the segment 3a of the trigger 3 when the trigger 3 is pulled in the direction of the arrow A. Furthermore, the second pseudo switch 36b is provided on the casing of the radio control transmitter 1 to be capable of pressing a pressure unit 36ba by the projection 3bb on the segment 3b of the trigger 3 when the trigger 3 is operated in the direction of the arrow B. Further, the first pseudo switch 36a includes a leaf spring having elasticity in the same way as Example 8. The first pseudo switch 36a includes the pressure unit (pressure face) 36aa displaced by pressure of the projection 3aa when the segment 3a of the trigger 3 is rotated in the direction of the arrow A, and a fitting hole 36ab into which a fitting projection 1*a* of the casing fits. The first pseudo switch 36*a* is attached to the casing to be attachable to and detachable from the casing by fitting the fitting projection 1*a* into the fitting hole 36*ab*. Furthermore, the second pseudo switch 36*b* also includes a leaf spring having elasticity in the same way as the first pseudo switch 36*a*. The second pseudo switch 36*b* includes the pressure unit (pressure face) 36*ba* displaced by pressure of the projection 3*bb* when the segment 3*b* of the trigger 3 is rotated in the direction of the arrow B, and a fitting hole 36*bb* into which a fitting projection 1*b* of the casing fits. The second pseudo switch 36*b* is attached to the casing to be attachable to and detachable from the casing by fitting the fitting projection 1*b* into the fitting hole 36*bb*.

In Example 9, the operator can previously select setting of conducting full throttle, setting of conducting partial throttle, or setting of turning on the turbo function for the first pseudo switch 36*a* and conduct the setting on the storage unit 10 via the control unit 8, while confirming the display on the display 4, which is a display device, by using the setting operation member 7.

Furthermore, it is possible to select setting of an intense brake function or setting of an ABS function and sets the selected setting for the second pseudo switch 36*b*.

If the setting of conducting full throttle when the first pseudo switch 36*a* is on is executed, full throttle in which the throttle is fully open can be attained in the same way as Example 1 when the pressure unit 36*aa* in the first pseudo switch 36*a* is pressed by the projection 3*aa* on the segment 3*a* of the trigger 3. If the setting of conducting the partial throttle when the first pseudo switch 36*a* is on is executed, it becomes easily possible to make the model travel with partial throttle according to the operation of the trigger 3 and it becomes possible to suppress consumption of the battery or fuel in the model in the same way as Example 2 when the pressure unit 36*aa* in the first pseudo switch 36*a* is pressed by the projection 3*aa* on the segment 3*a* of the trigger 3. In addition, if the setting of turning on the turbo function when the first Pseudo switch 36*a* is on is executed, it becomes possible to arbitrarily control on/off of the turbo function which is automatically turned on in the state of full throttle in ordinary circumstances in the same way as Example 3 by depression of the first pseudo switch 36*a* when the pressure unit 36*aa* in the first pseudo switch 36*a* is pressed by the projection 3*aa* on the segment 3*a* of the trigger 3.

It is now supposed that the setting of activating an intense brake function when the second pseudo switch 36*b* is on is executed. The pressure unit 36*ba* in the second pseudo switch 36*b* is pressed by the projection 3*bb* on the segment 3*b* of the trigger 3. In the same way as Example 4, it is possible to apply an intense brake only when the second pseudo switch 36*b* is on. It is now supposed that the setting of activating the ABS function when the second pseudo switch 36*b* is on is executed. The pressure unit 36*ba* in the second pseudo switch 36*b* is pressed by the projection 3*bb* on the segment 3*b* of the trigger 3. In the same way as Example 5, it is possible to activate the ordinary brake operation in usual operation of the trigger 3 in the direction of the arrow B and activate the ABS function only when the second pseudo switch 36*b* has turned on.

According to the configuration using the pseudo switches 26, 36*a* and 36*b* in Example 8 and Example 9, electronic switches and wiring are not necessary in this way. The configuration can be implemented by using only a mechanical mechanism, and the configuration can be simplified.

Furthermore, owing to a load change conveyed directly to a hand when operating an operation member (the trigger or the stick), it is possible to confirm full throttle by feeling, for example, in travel laying stress on the fuel.

In addition, the pseudo switches 26, 36*a* and 36*b* in Example 8 and Example 9 are provided to be attachable to and detachable from the casing of the radio control transmitter 1. Therefore, the conventional trigger operation can be restored easily by removing the pseudo switches from the casing.

The pseudo switches 26, 36*a* and 36*b* in Example 8 and Example 9 are configured to be attached to the casing to be capable of attachable to and detachable from the casing by fitting the fitting projections 1*a* and 1*b* into the fitting holes 26*b*, 36*ba* and 36*bb* of the leaf spring. However, the pseudo switches are not restricted to this configuration. For example, an attachable and detachable configuration can be obtained by forming a fitting groove on the casing and fitting portions of the leaf springs functioning as the Pseudo switches 26, 36*a* and 36*b* other than the pressure units 26*a*, 36*aa* and 36*ba* (for example, end portions on the opposite side from the pressure units 26*a*, 36*aa* and 36*ba*) into the fitting groove on the casing.

Furthermore, in Example 9, it is desirable that the pressure unit 36*aa* in the first pseudo switch 36*a* is pressed by the projection 3*aa* on the segment 3*a* of the trigger 3 when the operation amount of the trigger 3 in the direction of the arrow A is maximized and the pressure unit 36*ba* in the second pseudo switch 36*b* is pressed by the Projection 3*bb* on the segment 3*b* of the trigger 3 when the operation amount of the trigger 3 in the direction of the arrow B is maximized.

In addition, the pressure unit 26*a* in the pseudo switch 26 in Example 8 and the pressure units 36*aa* and 36*ba* respectively in the pseudo switches 36*a* and 36*b* in Example 9 need only have elasticity to an extent that the operator can recognize whether the trigger 3 functioning as the operation member is in contact. Therefore, the pseudo switch is not restricted to a leaf spring. For example, the pseudo switch may include a spring or rubber and may be provided on the casing of the radio control transmitter 1 to be attachable and detachable.

Furthermore, the above-described configuration of the pseudo switches 26, 36*a* and 36*b* in Example 8 and Example 9 can also be adopted in the stick type radio control transmitter 11 shown in FIG. 7.

In addition, in the configuration in Example 8 and Example 9, the projections 3*aa* and 3*bb* are provided respectively on the segments 3*a* and 3*b* of the trigger 3 functioning as the operation member and the pseudo switches 26, 36*a* and 36*b* are provided on the casing of the radio control transmitter 1. However, a configuration in which dispositions of the projections 3*aa* and 3*bb* and the pseudo switches 26, 36*a* and 36*b* are reversed may also be used. In other words, it is also possible to provide the pseudo switches 26, 36*a* and 36*b* on the operation member (the trigger 3 or the stick 12 or 13) and provide the projections 3*aa* and 3*bb* on the casing of the radio control transmitter 1.

Furthermore, in the configuration in Example 8 and Example 9, the projections 3*aa* and 3*bb* are provided on the trigger 3 functioning as the operation member and the projections 3*aa* and 3*bb* presses the pressure units 26*a*, 36*aa* and 36*ba* respectively in the pseudo switches 26, 36*a* and 36*b*. However, the projections 3*aa* and 3*bb* are not restricted to the illustrated shapes. The operation member (the trigger 3 or the stick 12 or 13) itself may have a shape capable of pressing the pressure units 26a, 36aa and 36ba respectively in the pseudo switches 26, 36a and 36b.

What is claimed is:

1. A gun-shaped radio control transmitter for transmitting a control signal to a target to be controlled, the radio control transmitter comprising:
    a grip adapted to be held by an operator;
    an operation member operated by a forefinger of the operator, controlling a travel speed of the target in accordance with an operation amount of the operation member, said operation member being operable in two different directions away from a neutral position, the operation member being a trigger; and
    a switch located on one of the grip and a barrel of the gun-shaped radio control transmitter and pressable by the operation member when the operation member moves in one direction of the two directions,
    wherein the operation member is rotatably supported by the radio control transmitter and the operation member partially comes in contact with the radio control transmitter when the operation member rotates respectively in the two directions predetermined amounts, and the switch is located where the operation member partially comes in contact with the radio control transmitter, and
    wherein a signal is transmitted to execute an operation of changing the travel speed of the target to be controlled preset in the radio control transmitter when the switch is depressed.

2. A gun-shaped radio control transmitter for transmitting a control signal to a target to be controlled, the radio control transmitter comprising:
    a grip adapted to be held by an operator;
    an operation member operated by a forefinger of the operator, controlling a travel speed of the target in accordance with an operation amount of the operation member, said operation member being operable in two different directions away from a neutral position, the operation member being a trigger;
    a first switch located on one of the grip and a barrel of the gun-shaped radio control transmitter and pressable by the operation member when the operation member moves in one direction of the two directions; and
    a second switch located on the other of the grip and a barrel of the gun-shaped radio control transmitter and pressable by the operation member when the operation member moves in the other direction of the two directions,
    wherein the operation member is rotatably supported by the radio control transmitter and the operation member partially comes in contact with the radio control transmitter when the operation member rotates respectively in the two directions predetermined amounts, and the first and second switches are located where the operation member partially comes in contact with the radio control transmitter, and
    wherein a signal is transmitted to execute an operation of changing the travel speed of the target to be controlled preset in the radio control transmitter when each of the first switch and the second switch is depressed.

* * * * *